(12) United States Patent
Okuda et al.

(10) Patent No.: US 10,329,443 B2
(45) Date of Patent: *Jun. 25, 2019

(54) INK SET AND RECORDING APPARATUS

(71) Applicant: Seiko Epson Corporation, Tokyo (JP)

(72) Inventors: Ippei Okuda, Shiojiri (JP); Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 328 days.

This patent is subject to a terminal disclaimer.

(21) Appl. No.: 15/170,011

(22) Filed: Jun. 1, 2016

(65) Prior Publication Data

US 2016/0272835 A1    Sep. 22, 2016

Related U.S. Application Data

(63) Continuation of application No. 13/778,475, filed on Feb. 27, 2013, now Pat. No. 9,382,439.

(30) Foreign Application Priority Data

Feb. 29, 2012  (JP) ................................ 2012-043156

(51) Int. Cl.
*B41J 11/00* (2006.01)
*C09D 11/40* (2014.01)
(Continued)

(52) U.S. Cl.
CPC ........... *C09D 11/40* (2013.01); *B41J 11/0015* (2013.01); *C09D 11/037* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 6,428,143 B2    8/2002  Irihara et al.
7,097,287 B2    8/2006  Nakao et al.
(Continued)

FOREIGN PATENT DOCUMENTS

EP    2210742       7/2010
JP    2007-154016 A  6/2007
(Continued)

OTHER PUBLICATIONS

Extended European Search Report for Application No. EP 13 15 7049 dated Feb. 3, 2015 (5 pages).

*Primary Examiner* — Manish S Shah
(74) *Attorney, Agent, or Firm* — Harness, Dickey & Pierce, P.L.C.

(57) ABSTRACT

An ink set includes an ink composition for background containing a pigment for background and a coloring ink composition containing a coloring pigment. Provided that the surface tension of the ink composition for background is S1 (mN/m), and the surface tension of the coloring ink composition is S2 (mN/m), S1 and S2 satisfy $-5<(S1-S2)<4$. the ink set is used in a first mode in which the ink composition for background and the coloring ink composition are recorded on a recording medium by being caused to be adjacent to each other, or in a second mode in which the ink composition for background is recorded on an image which has been recorded using the coloring ink composition. A recording apparatus includes this ink set.

14 Claims, 3 Drawing Sheets

(51) Int. Cl.
*C09D 11/322* (2014.01)
*C09D 11/38* (2014.01)
*C09D 11/037* (2014.01)
*C09D 11/107* (2014.01)

(52) U.S. Cl.
CPC .......... *C09D 11/107* (2013.01); *C09D 11/322* (2013.01); *C09D 11/38* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | |
|---|---|---|
| 2004/0187732 A1 | 9/2004 | Roman et al. |
| 2004/0189772 A1* | 9/2004 | Arai ................. B41J 3/543 347/102 |
| 2006/0189712 A1 | 8/2006 | Kondo |
| 2007/0067928 A1 | 3/2007 | Ellis |
| 2007/0188535 A1 | 8/2007 | Elwakil et al. |
| 2008/0079794 A1 | 4/2008 | Ohira |
| 2009/0081423 A1* | 3/2009 | Sano ................. B41J 3/407 428/195.1 |
| 2009/0169761 A1 | 7/2009 | Szajewski et al. |
| 2010/0087595 A1 | 4/2010 | Koganehira et al. |
| 2010/0091052 A1 | 4/2010 | Ogawa et al. |
| 2011/0057981 A1 | 3/2011 | Aruga et al. |
| 2011/0205288 A1 | 8/2011 | Matsuyama et al. |
| 2011/0234682 A1* | 9/2011 | Ohta ................. C09D 11/322 347/20 |
| 2012/0121831 A1 | 5/2012 | Kudoh et al. |
| 2012/0287211 A1* | 11/2012 | Sano ................. B41J 2/07 347/100 |

FOREIGN PATENT DOCUMENTS

| | | |
|---|---|---|
| JP | 2008-248008 A | 10/2008 |
| JP | 2011-195766 A | 10/2011 |
| JP | 2011-231202 A | 11/2011 |
| WO | WO-2006-087930 A1 | 8/2006 |
| WO | WO-2009-069721 | 6/2009 |
| WO | WO-2009-091079 | 7/2009 |
| WO | WO-2010-038457 A1 | 4/2010 |
| WO | WO-2010-050618 A1 | 5/2010 |
| WO | WO-2011007888 A1 | 1/2011 |

* cited by examiner

FIG. 3

| | INK TYPE | EXAMPLE 1 WHITE | EXAMPLE 1 COLOR | EXAMPLE 2 WHITE | EXAMPLE 2 COLOR | EXAMPLE 3 WHITE | EXAMPLE 3 COLOR | EXAMPLE 4 WHITE | EXAMPLE 4 COLOR | COMPARATIVE EXAMPLE 1 WHITE | COMPARATIVE EXAMPLE 1 COLOR | COMPARATIVE EXAMPLE 2 WHITE | COMPARATIVE EXAMPLE 2 COLOR |
|---|---|---|---|---|---|---|---|---|---|---|---|---|---|
| INK COMPOSITION (% BY MASS) | WHITE PIGMENT (*1) | 10 | — | 10 | — | 10 | — | 10 | — | 10 | — | 10 | — |
| | CYAN PIGMENT (*2) | — | 4 | — | 4 | — | 4 | — | 4 | — | 4 | — | 4 |
| | ACRYLIC STYRENE-BASED RESIN (*3) | 3 | 1 | 3 | 1 | 3 | 1 | 3 | 1 | 3 | 1 | 3 | 1 |
| | SURFACTANT A (*4) | — | 0.5 | 0.4 | 0.5 | 0.3 | 0.5 | 0.2 | 0.5 | — | 0.5 | — | 0.5 |
| | SURFACTANT B (*5) | 0.8 | — | — | — | — | — | — | — | 1.2 | — | — | — |
| | SURFACTANT C (*6) | — | — | — | — | — | — | — | — | — | — | 1 | — |
| | PROPYLENE GLYCOL | 10 | 10 | 10 | 10 | 10 | 10 | 10 | 10 | 10 | 10 | 10 | 10 |
| | 1,2-HEXANEDIOL | 3 | 3 | 3 | 3 | 3 | 3 | 3 | 3 | 3 | 3 | 3 | 3 |
| | 2-PYRROLIDONE | 2 | 2 | 2 | 2 | 2 | 2 | 2 | 2 | 2 | 2 | 2 | 2 |
| | PURE WATER | REMNANT | REMNANT | REMNANT | REMNANT | REMNANT | REMNANT | REMNANT | REMNANT | REMNANT | REMNANT | REMNANT | REMNANT |
| SURFACE TENSION (mN/m) | | 22 | 26 | 24 | 26 | 26 | 26 | 28 | 26 | 21 | 26 | 30 | 26 |
| (SURFACE TENSION) − (SURFACE TENSION) (OF COLOR INK) (OF WHITE INK) | | −4 | | −2 | | 0 | | +2 | | −5 | | +4 | |
| EVALUATION | IRREGULAR AGGREGATION ON RECORDING MEDIUM | A | A | A | A | A | A | B | A | A | A | C | A |
| | IRREGULAR AGGREGATION AT THE TIME OF SUPERIMPOSITION OF INK | A | | A | | B | | B | | A | | C | |
| | HORIZONTAL BLEEDING (COLOR MIXING) | B | | A | | A | | A | | B | | B | |
| | VERTICAL BLEEDING (SINKING) | B | | A | | A | | A | | C | | A | |

*1: titanium dioxide (metal oxide)
*2: C.I. Pigment Blue 15:3
*3: "Joncryl 62J" manufactured by BASF
*4: "BYK348" manufactured by BYK-Chemie Japan K.K.
*5: "PD570" manufactured by Nissin Chemical Industry Co., Ltd.
*6: "E1010" manufactured by Nissin Chemical Industry Co., Ltd.

INK SET AND RECORDING APPARATUS

CROSS-REFERENCE TO RELATED APPLICATIONS

This is a continuation patent application of U.S. application Ser. No. 13/778,475 filed Feb. 27, 2013, which claims priority to Japanese Patent Application No. 2012-043156 filed Feb. 29, 2012, both of which are expressly incorporated by reference herein in their entireties.

BACKGROUND

1. Technical Field

The present invention relates to an ink set and a recording apparatus.

2. Related Art

It is known that when printing is performed on a recording medium having optical transparency, for example, a resin film having optical transparency, a white printing layer as an underlying layer is formed of a white ink, and an image is formed on the formed white layer by a predetermined coloring ink (for example, see JP-A-2008-248008).

Moreover, it is also known that when an image printed using a recording medium having optical transparency is viewed, a predetermined image formed of a white ink is recorded as a light-blocking layer for an image which is formed of a coloring ink on the recording medium having optical transparency, so as to suppress the transparency of the image recorded by the coloring ink.

However, when a white ink as an ink composition for background and a coloring ink composition are recorded in a state of being adjacent to each other or superposed on each other in JP-A-2008-248008, there is a concern that color mixing called bleeding that results from the difference in physical properties between the ink compositions or blurring may be caused in the boundary between the respective ink compositions, that is, in the contact portion between the white ink and the coloring ink composition.

SUMMARY

An advantage of some aspects of the invention is to provide an ink set which can inhibit not only bleeding caused in the boundary between an ink composition for background and a coloring ink composition but also aggregation of the coloring ink composition and a recording apparatus having a recording mode appropriate for recording the ink set on a recording medium.

The invention can be realized in the following forms or application examples.

APPLICATION EXAMPLE 1

According to Application Example 1, there is provided an ink set including: an ink composition for background containing a pigment for background; and a coloring ink composition containing a coloring pigment, wherein provided that the surface tension of the ink composition for background is S1 (mN/m), and the surface tension of the coloring ink composition is S2 (mN/m), S1 and S2 satisfy $-5<(S1-S2)<4$, and the ink set is used in a first mode in which the ink composition for background and the coloring ink composition are recorded on a recording medium by being caused to be adjacent to each other, or in a second mode in which the ink composition for background is recorded on an image which has been recorded using the coloring ink composition.

When an image is recorded and formed by being caused to be adjacent to or superposed on a color image formed of a coloring ink composition, by using an ink composition for background that contains a pigment for background and exhibits a higher sedimentation speed of a pigment compared to the coloring ink composition, color mixing of the pigment for background into the color image or a phenomenon which is so-called bleeding in which the pigment sinks into the color image is caused. Accordingly, the definition of the image is lowered, or the color of the color image is impaired in some cases. However, according to the ink set of the present application example, a difference of surface tension between the ink composition for background and the coloring ink composition is set to be greater than $-5$ and less than 4, whereby the ink composition for background may be prevented from being aggregated in the color image formed of the coloring ink composition. Consequently, for example, in recording of an image that is formed on a color image by using the ink composition for background, that is, in the second mode, a uniform background image that easily wets and spreads on the color image is formed, and drying of the ink composition for background is accelerated, whereby the pigment for background may be prevented from sinking into the color image. Likewise, even in the first mode, the aggregation of the ink composition for background that is caused in the boundary adjacent to the color image may be inhibited, and the color mixing of the ink composition for background into the color image may be inhibited.

APPLICATION EXAMPLE 2

In Application Example 1, the S1 is 28 (mN/m) or less.

According to Application Example 1, wettability with respect to a recording medium in the first mode is excellently maintained, whereby the aggregation of the ink composition for background caused on the recording medium may be inhibited.

APPLICATION EXAMPLE 3

In Application Example 1, a sedimentation speed v of the pigment for background that is represented by the following Formula (1) is $2.0 \times 10^{-6}$ (cm/s) or higher, $$V=\{(\rho-\rho_w)gR^2\}/(18\eta) \qquad (1),$$

wherein v represents a sedimentation speed (cm/s), $\rho$ represents a pigment density (g/cm$^3$), $\rho w$ represents a solvent density (g/cm$^3$), g represents acceleration of gravity (m/s$^2$), R represents a pigment diameter (cm), and $\eta$ represents a solvent viscosity (Pa·s).

The Formula (1) is called Stokes' equation. According to Application Example 1, the pigment for background having a high sedimentation speed calculated by Stokes' equation easily blurs with the underlying image in the second mode. However, according to the invention of the application example, such a problem may be prevented excellently.

APPLICATION EXAMPLE 4

In Application Example 1, the ink composition for background and the coloring ink composition contain one or more kinds selected from a group consisting of glycol ethers having an HLB value in a range of 4.2 to 7.8 that is measured by Davies' method, a polyether siloxane-based surfactant, and a fluorosurfactant.

According to Application Example 4, the ink may easily wet and spread on an image.

APPLICATION EXAMPLE 5

According to Application Example 5, there is provided a recording apparatus including: the ink set, the first mode, and the second mode according to Application Example 1.

According to the recording apparatus of the application example, a recording apparatus that may form a recorded matter in which color mixing or bleeding as sinking is inhibited may be obtained.

APPLICATION EXAMPLE 6

In Application Example 5, when the ink composition for background is recorded in the second mode, a degree of drying of an image which has been recorded using the coloring ink composition is from 40% to 90%.

According to Application Example 6, the ink composition for background may be inhibited from being aggregated on the color image, and a recording apparatus that may form a recorded matter in which sinking of the pigment for background is inhibited may be obtained.

APPLICATION EXAMPLE 7

In Application Example 5, the recording apparatus further includes a third mode in which the coloring ink composition is recorded on the image which has been recorded using the ink composition for background.

According to Application Example 7, even if a color image is formed of the coloring ink composition on the background image formed of the ink composition for background, aggregation of the coloring ink composition is inhibited. Therefore, even when an optically transparent substrate is used as a recording medium, a color may be obtained from a desired coloring ink composition.

APPLICATION EXAMPLE 8

In Application Example 7, a degree of drying of the image, which has been recorded using the coloring ink composition, at the time when the ink composition for background is recorded in the second mode, is higher than a degree of drying of the image, which has been recorded using the ink composition for background, at the time when the coloring ink composition is recorded in the third mode.

According to Application Example 8, the surface tension of the ink composition for background with respect to the color image formed of the coloring ink composition becomes higher than the surface tension thereof on a recording medium, for example, an optically transparent resin film. However, by increasing the degree of drying of the color image, the increase in surface tension of the ink composition for background with respect to the color image may be inhibited. Consequently, the ink composition for background may be inhibited from being aggregated on the color image.

APPLICATION EXAMPLE 9

In Application Example 7, the recording apparatus further includes a drying unit for drying the ink composition for background or the coloring ink composition recorded on a recording medium, wherein the drying unit consumes a longer time to dry the coloring ink composition recorded before the ink composition for background is recorded in the second mode than to dry the ink composition for background recorded before the coloring ink composition is recorded in the third mode.

According to Application Example 9, since the recording apparatus includes the drying unit, the degree of drying may be controlled by the drying time. Consequently, by setting the drying time of the color image in the second mode to be longer than the drying time of the color image in the third mode, the degree of drying of the color image in the second mode may be heightened. As a result, the ink composition for background may be inhibited from being aggregated on the color image.

BRIEF DESCRIPTION OF THE DRAWINGS

The invention will be described with reference to the accompanying drawings, wherein like numbers reference like elements.

FIG. 2A shows a recorded matter obtained by a first mode, FIG. 2B shows a recorded matter obtained by a second mode, and FIG. 2C shows a recorded matter obtained by a third mode.

FIG. 3 is a table showing examples.

DESCRIPTION OF EXEMPLARY EMBODIMENTS

Hereinafter, embodiments according to the invention will be described with reference to drawings.

First Embodiment

Figure 1:
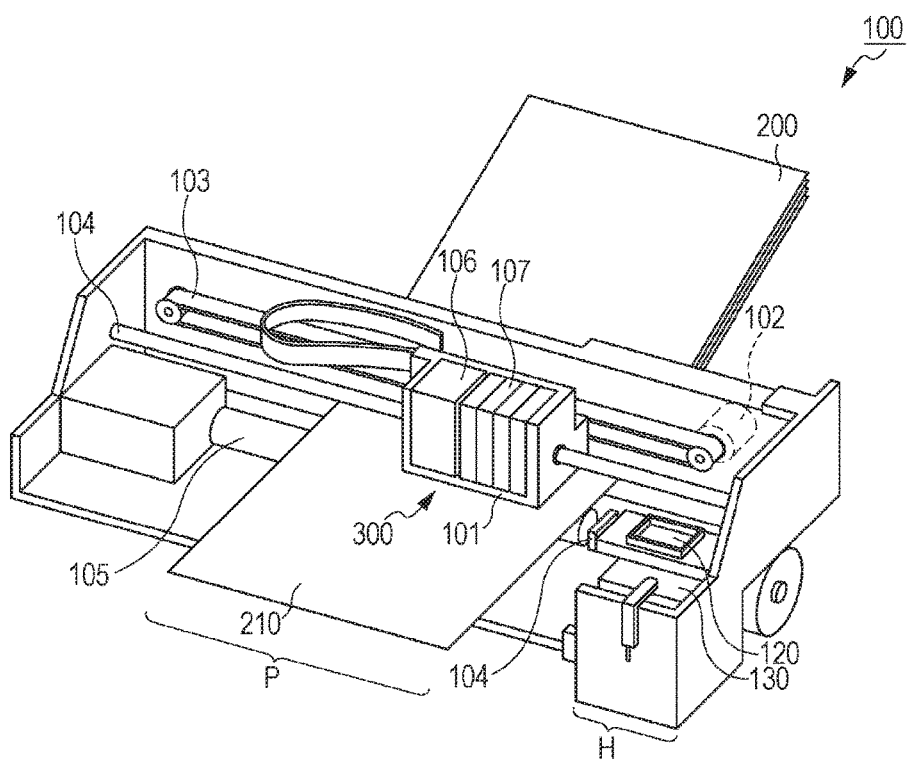
FIG. 1 is a schematic perspective view showing an ink jet recording apparatus.

FIG. 1 is a schematic perspective view showing an ink jet recording as a recording apparatus according to a first embodiment. As shown in FIG. 1, the ink jet recording apparatus 100 includes a carriage 101. The carriage 101 is guided by a guide member 104 and reciprocates in the axial direction of a platen 105 via a timing belt 103 driven by a carriage motor 102. A recording medium 200 is transported to the gap between the carriage 101 and the platen 105 by a transport mechanism not shown in the drawing.

An ink jet recording head 300 is mounted on the carriage 101, in a position where the carriage 101 faces the recording medium 200. Moreover, on top of the ink jet recording head 300, a white ink cartridge 106 containing a white ink as the ink composition for background and color and black ink cartridges 107 containing color and black inks as the coloring ink composition are detachably mounted so as to supply ink as a liquid to the ink jet recording head 300. The recording medium 200 is disposed in a printing area P. When ink is discharged from the ink jet recording head 300, letters, images, and the like are recorded on the recording medium. The recording medium 200 on which letters, images, and the like have been recorded is discharged as a recorded matter 210.

In addition, as shown in FIG. 1, there is a non-printing area in which the recording medium 200 is not disposed. For example, in a home position H, cleaning units including a cap member, a suction unit, or the like, for example, a capping unit 120, a suction pump 130, and a wiping member 140 are disposed.

A method of performing recording on the recording medium 200 by the ink jet recording apparatus 100 according to a first embodiment will be schematically described. The ink jet recording apparatus 100 has recording modes including a first mode for forming a recorded matter 210a shown in FIG. 2A, a second mode for forming a recorded matter 210b shown in FIG. 2B, and a third mode for forming a recorded matter 210c shown in FIG. 2C.

Figure 2A:
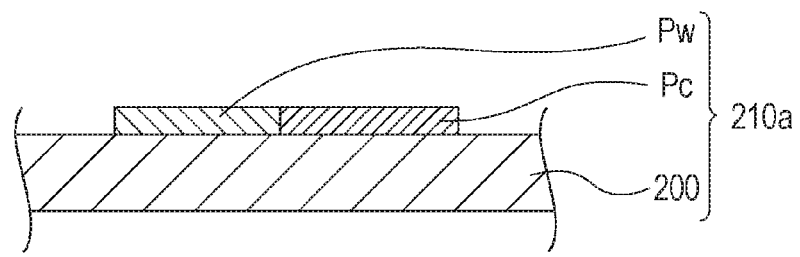
FIGS. 2A to 2C are enlarged cross-sectional views schematically showing matters recorded by an ink jet recording apparatus.

In the recorded matter 210a shown in FIG. 2A, a white image Pw and a color image Pc are formed on the recording medium 200 while being adjacent to each other. In the recorded matter 210b shown in FIG. 2B, the color image Pc is formed on the recording medium 200, and the white image Pw is formed while being superposed on the color image Pc. In the recorded matter 210c shown in FIG. 2C, the white image Pw is formed on the recording medium 200, and the color image Pc is formed while being superposed on the white image Pw.

The recording method performed by the ink jet recording apparatus 100 includes a recording mode selecting step for selecting a recording mode, a first recording step for initially forming a recorded image based on the selected recording mode, a drying step for drying the image formed by the first recording step, and a second recording step for forming the next recorded image based on a recording mode selected after the drying step.

Recording Mode Selecting Step

In the recording mode selecting step, a recording mode is selected and designated by a method in which one of the first, second, and third modes is selected, and a recording mode is selected and designated by an operation section which is included in the ink jet recording apparatus 100 and not shown in the drawing, a method in which a recording mode is selected and designated by a personal computer which is connected to the ink jet recording apparatus 100 and not shown in the drawing, or the like.

First Recording Step

Based on the recording mode selected in the recording mode selecting step, a predetermined ink is discharged onto the recording medium 200 by an ink jet method, whereby an image is formed and recorded. In the first recording step in which the first or third mode is selected, the white image Pw as an example of an image for background is formed (hereinafter, the white image Pw as an example of an image for background will be described). It is preferable that the recording medium 200 be one kind selected from coated paper such as printing paper, polyethylene terephthalate, polyethylene, polypropylene, polyvinyl chloride, a metal, and glass. These kinds of the recording medium 200 does not absorb ink or absorbs ink to a low degree, and the amount of water absorbed by the recording medium 200 that is measured by Bristow method for 30 msec from the initial point of contact with water is 1 ml/m$^2$ or less.

It is preferable that an ink for background substantially do not contain alkyl polyol having a boiling point of 280° C. or higher under 1 atm. For example, the ink for background may contain propylene glycol having a boiling point of 188° C. under 1 atm, but does not contain glycerin having a boiling point of 280° C. or higher under 1 atm, polyethylene glycol having a boiling point of 280° C. or higher under 1 atm, polypropylene glycol having a boiling point of 280° C. or higher under 1 atm, and the like. In addition, the ink for background is not particularly limited as long as it is an ink used for the background, but it is preferable that the ink for the background be a white ink or a glitter ink. As white pigments contained in the white ink, for example, titanium oxide, zinc oxide, zirconium oxide, a resin including fine hollow resin particles can be used. Herein, in view of excellent whiteness, pigments containing fine titanium oxide particles are preferable. Though not particularly limited, an average particle size of the white pigment is preferably from 100 nm to 1 µm, more preferably from 200 nm to 400 nm, even more preferably from 250 nm to 380 nm, and most preferably from 260 nm to 350 nm. Further, those fine particles may be fine particles coated with silicon oxide, alumina, or the like.

A glitter ink contains a glitter pigment. The glitter pigment is not particularly limited as long as it can glitter when being attached to a medium. Examples thereof include one or two or more kinds of alloys (also called metallic pigments) selected from a group consisting of aluminum, silver, gold, platinum, nickel, chromium, tin, zinc, indium, titanium, and copper, and pearl pigments having pearly gloss. Typical examples of the pearl pigment include pigments having pearly gloss or interference gloss, such as mica coated with titanium dioxide, argentine, and bismuth oxychloride.

It is preferable that a sedimentation speed v of the pigment for background that is obtained by the "Strokes' equation" represented by the following Formula (2) be 2.0×10$^{-6}$ (cm/s) or higher. The pigment for background having a high sedimentation speed calculated by the Strokes' equation easily blurs with the underlying image in the second mode. However, according to the invention of the present application, such a problem can be prevented excellently.

$$v=\{(\rho-\rho_w)gR^2\}/(18\eta) \tag{2}$$

In Formula (2), v represents a sedimentation speed (cm/s), ρ represents a pigment density (g/cm$^3$), ρw represents a solvent density (g/cm$^3$), g represents acceleration of gravity (m/s$^2$), R represents a pigment diameter (cm), and η represents a solvent viscosity (Pa·s).

The white image Pw recorded in the first recording step may be a solid image formed on the recording medium 200. Alternatively, the white image Pw may be formed according to the position where a colored image is formed of a color or black ink. In order to obtain sufficient visibility of the colored image recorded on the white image Pw, a whiteness of the white image Pw formed of a white ink is preferably 73 or higher and more preferably 75 or higher. Herein, the amount of the white pigment that is used for recording an image for background (white image Pw in the embodiment) is preferably 0.8 g/m$^2$ or more and more preferably 1.0 g/m$^2$ or more.

In addition, the surface tension of the white ink is preferably 30 mN/m or less and more preferably 28 mN/m or less. Moreover, provided that the surface tension of the white ink as the ink composition for background is S1 (mN/m), and the surface tension of the coloring ink composition is S2 (mN/m), a difference in the surface tension between the white ink and the coloring ink described later is preferably −5<(S1−S2)<4.

In the first recording step in the second mode, the color image Pc is formed of a coloring ink by an ink jet method. The coloring ink contains a coloring material, and substantially does not contain alkyl polyol having a boiling point of 280° C. or higher under 1 atm. Herein, the surface tension of the coloring ink is preferably 30 mN/m or less, more preferably 28 mN/m or less, even more preferably 26 mN/m or less, still more preferably from 10 mN/m to 28 mN/m, and most preferably 10 mN/m to 26 mN/m.

Drying Step

In the invention of the present application, an activation energy ray (for example, ultraviolet ray) irradiation step or a drying step may be performed before the second recording step. When the drying step is performed, the white image Pw or the color image Pc formed in the first recording step is dried in the drying step. As the drying method, natural drying or drying by heating can be used. Examples of drying by heating include hot-air drying, heater drying in which the image is brought into direct contact with a heat source, drying by activation energy ray (for example, infrared ray), and the like. Moreover, the drying step may be performed simultaneously with the first recording step.

When the white image Pw is formed in the first recording step, that is, in the case of the first and third modes, it is preferable that the white image be dried such that the degree of drying of the image becomes 40% to 90% (preferably 55% to 90%). In addition, when the color image Pc is formed in the first recording step, that is, in the case of the second mode, it is preferable that the color image Pc be dried such that the degree of drying of the image becomes 40% to 90% (preferably 55% to 90%). Further, the degree of drying to be achieved in the drying step may be achieved by the time when the coloring ink discharged in the second recording step reaches the white image Pw or the color image Pc formed by the first recording step. Accordingly, the drying step is a step that continues until the coloring ink or the white ink reaches the white image Pw or the color image Pc in the second step after the white image Pw or the color image Pc is recorded on the recording medium 200 in the first step. Natural drying that is caused in the time period from the first step to the second step is also included in the drying step.

The degree of drying can be calculated by the following method. When an image is formed by imparting an ink to a recording medium, the mass of the recording medium corresponds to 0% of a degree of drying. At the point in time when the mass of the recording medium substantially stops changing after the image is dried under predetermined drying conditions, the degree of drying corresponds to 100%. From these two data and the data (interim degree of drying) obtained by varying the drying time, it is possible to show the change in mass and degree of drying of the recording medium under the same drying conditions. From the results obtained in this manner, the time taken from the formation of the image of background color to the formation of a color (excluding white) image, the mass of the recording medium at the time of the second recording step, and the like, the degree of drying can be calculated. In addition, when the drying temperature changes frequently, it is preferable that the degree of drying be calculated based on mass.

Regarding the drying time in the drying step of the image formed in the first recording step, it is preferable that the white image Pw formed by the first recording step of the third mode and the color image Pc formed by the first recording step of the second mode be dried for a long time. If the images are dried in this manner, when the white ink for forming the white image Pw is superposed by an ink jet method on the color image Pc formed on the recording medium 200 in the second recording step of the second mode described later, bleeding of the white image Pw to the color image Pc, that is, color mixing, blurring, and the like can be inhibited. The pigment for background tends to have a higher sedimentation speed compared to the coloring pigment used for the coloring ink. Accordingly, blurring caused in the second mode tens to be more serious compared to blurring caused in the third mode. Therefore, it is preferable that the dried state be enhanced in the second mode.

Second Recording Step

Based on the selected recording mode, for the white image Pw or the color image Pc formed in the first recording step, the color image Pc or the white image Pw is formed.

Figure 2B:
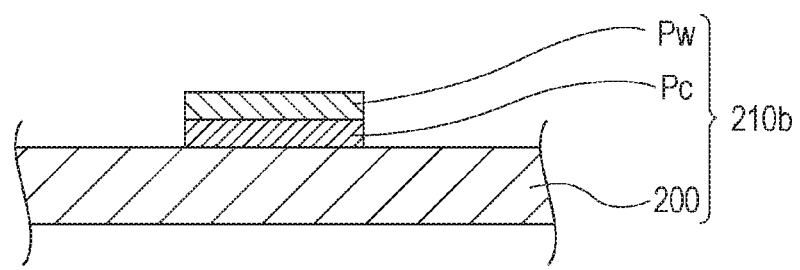
Figure 2C:
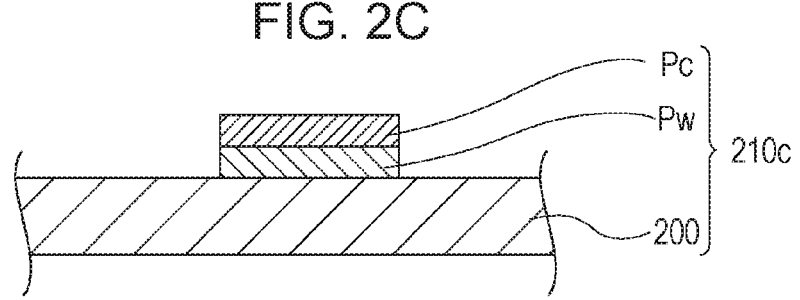

When the first mode is selected, in the second recording step, the color image Pc is formed so as to be adjacent to the white image Pw as shown in FIG. 2A, whereby the recorded matter 210a can be obtained. When the second mode is selected, in the second recording step, the white image Pw is formed so as to be superposed on the color image Pc as shown in FIG. 2B, whereby the recorded matter 210b can be obtained. Moreover, when the third mode is selected, in the second recording step, the color image is formed so as to be superposed on the white image Pw as shown in FIG. 2C, whereby the recorded matter 210c can be obtained.

Other Additives for Ink for Background and Coloring Ink

It is preferable that at least one of the ink for background or the coloring ink contain one or more kinds selected from a group consisting of glycol ethers having a Hydrophile Lipophile Balance (HLB) value in a range of 4.2 to 7.8 measured by Davies' method, a polyether siloxane-based surfactant, and a fluorosurfactant. If the ink contains such additives, the surface tension is lowered, and wettability with respect to the recording medium 200 becomes excellent. Generally, when being recorded on an image, the ink exhibits poorer wettability, compared to a case where the ink is recorded on the recording medium 200. Accordingly, in order to lower the surface tension, it is preferable to add the above additives.

Glycol Ether

If at least one of the ink for background and the coloring ink contains glycol ether having an HLB value satisfying the above range, it is possible to control the wettability and permeation speed without being influenced so much by the type of the recording medium 200. As a result, it is possible to record a clear image showing little density irregularity on the recording medium 200, particularly, to the ink non-absorbing or low-absorbing recording medium 200.

Herein, the HLB value of the glycol ethers used in the embodiment is a value proposed by Davies, et al. and evaluating hydrophilicity of a compound. It is a value obtained by the Davies' method defined in a document, for example, "J. T. Davies and E. K. Rideal, "Interface Phenomenon" $2^{nd}$ ed. Academic Press, New York 1963", and refers to a value calculated by the following Formula (3).

$$\text{HLB value} = 7 + \Sigma[1] + \Sigma[2] \qquad (3)$$

(here, [1] represents the number of hydrophilic group, and [2] represents the number of hydrophobic group).

Table 1 exemplifies the structure and the number of typical hydrophilic and hydrophobic groups.

TABLE 1

| Structure | Number |
| --- | --- |
| —$CH_2$— | −0.475 |
| —$CH_3$ | −0.475 |
| —($CH_2CH_2O$)— | +0.330 |
| —(CHCH$_2$O)—<br>\|<br>$CH_3$ | −0.150 |
| —OH | +1.900 |

The HLB value of the glycol ethers calculated by the Davies' method is in a range of 4.2 to 7.8, preferably in a range of 5.8 to 7.8, and more preferably in a range of 5.8 to 7.1. If the HLB value is less than 4.2, hydrophobicity of the glycol ethers is heightened. Accordingly, when water is used as a main solvent, affinity of the glycol ethers with water is lowered, so storage stability of the ink deteriorates in some cases. On the other hand, if the HLB value is greater than 7.8, the effects such as wettability and permeability with respect to the recording medium 200 are diminished, so density irregularity of the image becomes noticeable in some cases. Particularly, the effect such as wettability with respect to the ink non-absorbing or low-absorbing recording medium 200 which is a hydrophobic surface tends to be markedly diminished.

Specific examples of the glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, and the like. One kind of these can be used alone, or two or more kinds thereof can be used by being mixed with each other.

Among the glycol ethers exemplified, the glycol ethers containing an alkyl group having a branched structure are more preferable. If the ink contains the glycol ethers containing an alkyl group having a branched structure, it is possible to record a clear image not showing density irregularity, particularly on the ink non-absorbing or low-absorbing recording medium 200. Specific examples of the such glycol ethers include ethylene glycol monoisobutyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, and the like.

Among the branched structures of the alkyl group contained in the glycol ethers, in view of further improving chromogenic properties, a 2-methylpentyl group, a 2-ethylpentyl group, and a 2-ethylhexyl group are more preferable, and a 2-ethylhexyl group is particularly preferable. Specific examples of such glycol ethers include ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-methylpentyl ether, diethylene glycol mono-2-methylpentyl ether, and the like. Among these, ethylene glycol mono-2-ethylhexyl ether, diethylene glycol mono-2-ethylhexyl ether, triethylene glycol mono-2-ethylhexyl ether, and the like are particularly preferable.

The content of the glycol ethers is preferably in a range of 0.05% by mass to 6% by mass based on the total amount of the ink composition, in view of the effect of reducing density irregularity by improving wettability and permeability with respect to the recording medium 200 and securing storage stability and discharge reliability of the ink. If the content is less than 0.05% by mass, the wettability, permeability, and drying properties of the ink composition become insufficient. Accordingly, a clear image is not easily obtained, and printing density (chromogenic properties) becomes insufficient in some cases. Moreover, if the content is larger than 6% by mass, sometimes head clogging is caused since the viscosity of the ink increases, or the storage stability is not obtained since the glycol ethers do not completely dissolve in the ink composition. Glycol ethers poorly soluble in water are effective, and the content thereof is preferably in a range of 0.1% by mass to 2% by mass based on the total amount of the ink composition.

Polyether Siloxane-Based Surfactant

It is preferable that at least one of the white ink and the coloring ink contain a polyether siloxane-based surfactant. As a preferable surfactant, a surfactant represented by the following Formula (4) can be used. In Formula (4), each of R1 to R7 independently represents an alkyl group having 1 to 6 carbon atoms, and preferably represents a methyl group. Each of j and k independently represents an integer of 1 or greater, preferably represents 1 to 5, more preferably represents 1 to 4, and most preferably represents 1 or 2. It is preferable that j and k satisfy j=k=1 or k=j+1. Moreover, g represents an integer of 0 or greater, preferably represents 1 to 3, and most preferably represents 1. In addition, each of p and q represents an integer of 0 or greater, and preferably represents 1 to 5. Here, p+q is an integer of 1 or greater, and preferably 2 to 4, EO represents ethylene oxide, and PO represents propylene oxide.

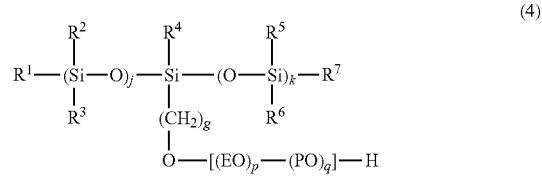

(4)

In the most preferable embodiment of the polyether siloxane-based surfactant as the compound of Formula (4), all of R1 to R7 represent a methyl group, j represents 1 to 2, k represents 1 to 2, g represents 1 to 2, p represents an integer of 1 to 5, and q represents 0.

The amount of such a polyether siloxane-based surfactant added may be determined appropriately. However, the amount is preferably from 0.03% by weight to 3% by weight, more preferably from about 0.1% by weight to about 2% by weight, and even more preferably from about 0.2% to about 1% by weight. If the amount is from 0.2% by weight to 1% by weight, when the surfactant is concurrently used with the glycol ethers described above, the ink is excellently filled in recording media that are flipped easily.

The polyether siloxane-based surfactant is not particularly limited. However, when an aqueous solution containing 20% by mass of glycerin, 10% by mass of 1,2-hexanediol, 0.1% by mass of the polyether siloxane-based surfactant, and 69.9% by mass of water is used, dynamic surface tension at 1 Hz of the aqueous solution is preferably 26 mN/m or less. The dynamic surface tension can be measured using, for example, a bubble pressure dynamic tensiometer BP2 (manufactured by KRÜSS).

As the polyether siloxane-based surfactant, commercially available surfactants on sale, for example, OLFINE PD-501 and OLFINE PD-570 (manufactured by Nissin Chemical Industry Co., Ltd.) and BYK-347 and BYK-348 (manufactured by BYK-Chemie), can be used.

Moreover, as the polyether siloxane-based surfactant, those represented by Formula (5) can be used.

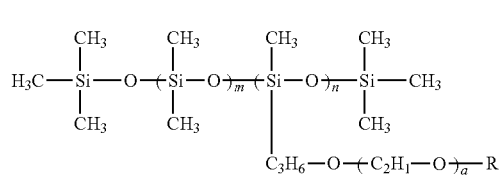

(5)

(In the formula, R represents a hydrogen atom or a methyl group, a represents an integer of 7 to 11 group, m represents an integer of 30 to 50, and n represents an integer of 3 to 5.)

It is preferable that the surfactant contains one or two or more kinds of compounds represented by Formula (5). Alternatively, it is more preferable that the surfactant contain one or two or more kinds of compounds represented by Formula (5) in which R represents a hydrogen atom or a methyl group, a represents an integer of 9 to 13, m represents an integer of 2 to 4, and n represents an integer of 1 to 2. In addition, it is even more preferable that the surfactant contain one or two or more kinds of compounds represented by Formula (5) in which R represents a hydrogen atom or a methyl group, a represents an integer of 6 to 18, m represents an integer of 0, and n represents an integer of 1. Further, it is still more preferable that the surfactant contain one or two or more kinds of compounds represented by Formula (5) in which R represents a hydrogen atom, a represents an integer of 2 to 5, m represents an integer of 20 to 40, and n represents an integer of 3 to 5. If a specific polyorganosiloxane-based surfactant as above is used, even if the ink is printed on the non-absorbing recording medium 200, bleeding of the ink is further improved.

If the compound represented by Formula (5) in which R represents a methyl group is used, beading of the ink is further improved. Moreover, if the compound represented by Formula (5) in which R represents a hydrogen atom is used concurrently, bleeding of the ink is further improved. The surfactant in which R represents a methyl group is contained in the ink, preferably in an amount of 0.01% by mass to 1.0% by mass, and more preferably in an amount of 0.05% by mass to 0.70% by mass.

Regarding the compound represented by Formula (5), if the compounding ratio between the compound in which R represents a methyl group and the compound in which R represents a hydrogen atom is appropriately adjusted, a high-quality image not showing bleeding or beading can be realized. In addition, such a compound is effective as an adjuster for a case where fluidity varies with the type of pigment or the amount of resin.

Fluorosurfactant

Moreover, the ink composition for background and the coloring ink may use a fluorosurfactant. As described in International Publication No. WO2010/050618 and International Publication No. WO2011/007888, a fluorosurfactant is known as a solvent that exhibits excellent wettability with respect to the non-absorbing or low-absorbing recording medium 200. In the invention of the present application, this surfactant can be preferably used by being concurrently used with the glycol ethers and polyether siloxanes described above. The fluorosurfactant is not particularly limited and can be appropriately selected according to the purpose, and examples thereof include perfluoroalkylsulfonate, perfluoroalkylcarboxylate, perfluoroalkyl phosphoric acid ester, a perfluoroalkyl ethylene oxide adduct, perfluoroalkyl betaine, a perfluoroalkyl amine oxide compound, and the like. Among these, the compounds represented by General Formulae (6) to (11) are particularly preferable in view of reliability, and the compounds represented by Formulae (6), (7), (8), and (11) are more preferable.

(6)

Here, in Formula (6), m represents an integer of 0 to 10, and n represents an integer of 0 to 40.

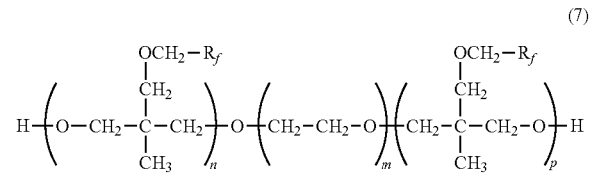

(7)

Here, in Formula (7), Rf represents a fluorine-containing group, and examples thereof include $CF_3$, $CF_2CF_3$, and the like. Each of m, n, and p represents an integer. m represents an integer of 6 to 25, n represents an integer of 1 to 4, and p represents 1 to 4.

(8)

Here, in Formula (8), $M^+$ represents one of $Li^+$, $Na^+$, $K^+$ and $NH_4^+$.

(9)

Here, in Formula (9), Rf represents one of $CF_3$, $C_2F_5$, $C_3F_7$, and $C_4F_9$, and $M^+$ represents one of $Li^+$, $Na^+$, $K^+$, and $NH_4^+$.

(10)

Here, in Formula (10), Rf represents one of $CF_3$, $C_2F_5$, $C_3F_7$, and $C_4F_9$, R represents an alkyl group having 1 to 10 carbon atoms, and $M^+$ represents one of $Li^+$, $Na^+$, $K^+$, and $NH_4^+$.

(11)

Here, in Formula (11), $M^+$ represents one of $Li^+$, $Na^+$, $K^+$, and $NH_4^+$.

As the fluorosurfactant, appropriately synthesized surfactants may be used, or commercially available products may be used. Examples of the commercially available products include S•144 and S•145 (manufactured by ASAHI GLASS CO., LTD.); FC•170C, FC•430, and Fluorad•FC4430 (manufactured by Sumitomo 3M Limited); FSO, FSO•100, FSN, FSN•100, and FS•300 (manufactured by DuPont);

FT•250 and 251 (manufactured by NEOS COMPANY LIMITED); and the like. Among these, FSO, FSO•100, FSN, FSN•100, and FS•300 manufactured by DuPont are preferable since these provide excellent printing quality and storability. One kind of the above surfactants as nonionic fluorosurfactants may be used alone, or two or more kinds thereof may be used concurrently.

When the recording medium 200 is a polyvinyl chloride, it is preferable that the white ink contain one or more kinds of non-protonic polar solvents selected from pyrrolidones, sulfoxides, imidazolidinones, and amide ethers. Typical examples of the pyrrolidones include 2-pyrrolidone, N-methyl-2-pyrrolidone, and N-ethyl-2-pyrrolidone. Typical examples of the sulfoxides include dimethyl sulfoxide, and typical examples of the imidazolidinones include 1,3-dimethyl-2-imidazolidinone.

The amide ethers correspond to the solvent represented by the following General Formula (12).

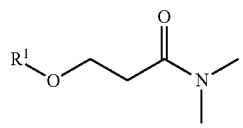

(12)

In Formula (12), $R^1$ preferably represents an alkyl group having 1 to 4 carbon atoms. The "alkyl group having 1 to 4 carbon atoms" can be a linear or branched alkyl group, for example, a methyl group, an ethyl group, an n-propyl group, an iso-propyl group, an n-butyl group, an iso-butyl group, a sec-butyl group, or a tert-butyl group. The solvent represented by Formula (12) in which $R^1$ represents an alkyl group having 1 to 4 carbon atoms can impart pseudoplastic properties to the ink composition to an appropriate degree, and as a result, excellent discharge stability of the ink can be secured. Moreover, since the solvent represented by Formula (12) in which $R^1$ represents an alkyl group having 1 to 4 carbon atoms interacts with a vinyl chloride-based resin, it is possible to firmly fix the ink onto the surface of the recording medium 200 containing the vinyl chloride-based resin.

The HLB value of the solvent represented by Formula (12) is from 10.5 to 20.0 and preferably from 12.0 to 18.5. If the HLB value of the solvent represented by Formula (12) is in the above range, this is preferable in the respect that pseudoplastic properties can be imparted to the ink to an appropriate degree, and the solvent interacts with the vinyl chloride-based resin. Further, The HLB value of the solvent represented by Formula (12) is a value calculated by the following formula from a ratio between an inorganic value (I) and an organic value (O) (hereinafter, also simply called a "I/O ratio") in the organic conception diagram.

HLB value=(inorganic value (I)/organic value (O))× 10

Specifically, the I/O value can be calculated based on the respective documents including Atsushi Fujita, "Systematic Organic Qualitative Analysis, Mixture", KAZAMASHOBO, 1974; Nobuhiko Kuroki, "Chemistry in theory of dyeing", Makishoten, 1966; and Hiroo Inoue, "Organic Compound Separation Method", SHOKABO PUBLISHING CO., LTD., 1990.

Other Additives

Surfactants Other than the Above Polyether siloxane-based surfactant and the fluorosurfactant may also be used. That is, anionic surfactants (for example, sodium dodecyl benzene sulfonate, sodium lauryl phosphate, and polyoxyethylene alkyl ether sulfate ammonium salt) and nonionic surfactants (for example, polyoxyethylene alkyl ether, polyoxyethylene alkyl ester, polyoxyethylene sorbitan fatty acid ester, and polyoxyethylene alkyl phenyl ether) may be used.

The ink composition for background and the coloring ink composition may contain alkane diol. As the alkane diol, 1,2-alkanediol, diols having an OH group on both terminals, such as 1,4-butanediol, 1,5-pentanediol, 1,6-hexanediol, and 1,7-heptanediol, and diols having a branched structure, such as 3-methyl-1,3-butanediol, 2-ethyl-1,3-hexanediol, 2-methyl-1,3-propanediol, 2,4-dimethyl-1,5-heptanediol, and 3-(2-methoxyphenoxy)-1,2-propanediol can be used. Among these, 1,2-alkanediol having 4 to 8 carbon atoms, such as 1,2-butanediol, 1,2-pentanediol, 1,2-hexanediol, 1,2-heptanediol, or 1,2-octanediol is preferable. Among these, 1,2-hexanediol, 1,2-heptanediol, and 1,2-octanediol having 6 to carbon atoms are more preferable since these exhibit a particularly high degree of permeability with respect to the recording medium 200.

In addition, the ink composition may contain, for example, alkyl alcohols having 1 to 4 carbon atoms, such as ethanol, methanol, butanol, propanol, and isopropanol, formamide, acetamide, dimethyl sulfoxide, sorbitol, sorbitan, acetin, diacetin, triacetin, sulfolane, dipropylene glycol, ethylene glycol, propylene glycol, and trimethylolpropane.

The ink composition for background and the coloring ink composition may be an aqueous ink containing 50% by mass or more of water, a solvent-based ink containing 50% by mass or more of an organic solvent, or an ink cured by activation energy rays that contains 50% by mass or more of a compound polymerized by activation energy rays. However, an aqueous ink or a solvent-based ink is preferable, in the respect that the advantage of the present application can be markedly obtained by the ink.

EXAMPLES

As the ink jet recording apparatus 100, an "ink jet printer PX-G930 (manufactured by Seiko Epson Corporation, nozzle resolution 180 dpi) was used, and this printer was modified such that a temperature variable heater was installed in a recording medium guiding section of the printer. In addition, the heating temperature was 45° C. Moreover, as the recording medium 200, Lumirror (registered trademark) S10-100 µm (manufactured by TORAY INDUSTRIES, INC., optically transparent PET film) was used.

Further, a white ink as the ink composition for background and a cyan pigment-containing color ink as the coloring ink composition that were composed as described in the table shown in FIG. 3 were used to create the recorded matters 210a and 210b on the recording medium 200 described above by the first mode shown in FIG. 2A and the second mode shown in FIG. 2B, followed by evaluation. The evaluation criteria are shown in Table 2.

In addition, titanium dioxide was used as a pigment of the white ink so as to prepare a titanium dioxide dispersion by the following method. 25 parts by mass of a solid acrylic acid/n-butyl acrylate/benzyl methacrylate/styrene copolymer having a glass transition temperature of 40° C., a mass average molecular weight of 10,000, and an acid value of 150 mg KOH/g was dissolved in a mixed solution of 75 parts by mass of diethylene glycol diethyl ether, thereby obtaining a polymer dispersant solution having a 25% by mass of a resin solid content.

19% by mass of diethylene glycol diethyl ether was added to and mixed with 36% by mass of the polymer dispersant solution to prepare a resin varnish for dispersing titanium dioxide, and 45% by mass of titanium dioxide (CR-90, treated with alumina silica (alumina/silica 0.5), an average particles size based on volume of 300 nm, oil absorption of 21 ml/100 g, manufactured by ISHIHARA SANGYO KAISHA, LTD.) was added thereto, followed by stirring and mixing. Thereafter, the mixture was kneaded with a wet type circulation mill, thereby obtaining a titanium dioxide dispersion.

In addition, the cyan pigment contained in the color ink composition was dispersed by the following method. 40 parts of a water-soluble resin (obtained by copolymerizing methacrylic acid, butyl acrylate, styrene, and hydroxyethyl acrylate at a mass ratio of 25/50/15/10, weight average molecular weight 12,000) was added to a mixed solution containing 7 parts of potassium hydroxide, 23 parts of water, and 30 parts of triethylene glycol-mono-n-butyl ether, followed by dissolution by heating and stirring at 80° C., thereby preparing a water-soluble resin solution. 3.0 kg of Pigment Blue 15:3, 1.5 kg of ethylene glycol, and 8.75 kg of water were mixed into 1.75 kg of the above solution (solid content 43%), and the mixture was stirred with a mixing stirrer to perform premixing. This pigment-mixed solution was dispersed by a multi-pass method by using a horizontal bead mill which was filled by 85% with 0.5 mm zirconia beads, had an effective volume of 1.5 L, and provided with a multi-disk impeller. Specifically, 2-pass milling was performed at a peripheral speed of beads of 8 m/sec and a discharge rate of 30 L/hour, thereby obtaining the pigment-mixed solution. Subsequently, circulation dispersion was performed using a horizontal annular type bead mill which was filled by 95% with 0.05 mm zirconia beads and had an effective volume of 1.5 L. 10 kg of the pigment-dispersed and mixed solution was dispersed for 4 hours at a circulation rate of 300 L/hour and a peripheral speed of beads of 10 m/sec by using a 0.015 mm screen, thereby obtaining a pigment dispersion containing 20% of a pigment solid content.

The degree of drying of the color image shown in FIG. 2B was about 70%, and the degree of drying of the white image shown in FIG. 2C was about 75%. Moreover, the surface tension was measured by a surface tensiometer CBVP-Z (manufactured by Kyowa Interface Science Co., LTD.).

Table 2 shows the evaluation criteria. The evaluation criteria shown in Table 2 are as follows.

1) Irregular Aggregation of Ink on Recording Medium 200

A degree of aggregation of the ink discharged onto the recording medium 200 was evaluated by duty. The duty refers to a value calculated by the following Formula (12).

duty (%)={(actual number of printed dots)/(vertical resolution)×(horizontal resolution)}×100

In the formula, the words "actual number of printed dots" refer to the actual number of dots printed per unit area, and the words "vertical resolution" and "horizontal resolution" refer to the resolution per unit length in each of vertical and horizontal directions. A duty of 100% means a maximum ink mass of a monochromatic ink based on pixels. A state where aggregation was not caused in a duty of 100% was evaluated to be "A", and a state where aggregation was caused even in a duty of 50% was evaluated to be "C", whereby the aggregation was evaluated by being classified into three degrees.

2) Irregular Aggregation at the Time of Superposition of Ink

In the embodiment of the printed matter 210*b* formed by the second mode shown in FIG. 2B, irregular aggregation of the white ink at the time when the white image Pw is formed on the color image Pc was evaluated. The evaluation was performed based on the above duty value. A state where aggregation was not caused in a duty of 100% was evaluated to be "A", and a state where aggregation was caused even in a duty of 50% was evaluated to be "C", whereby the aggregation was evaluated by being classified into three degrees.

3) Color Mixing Between White Image Pw and Color Image Pc

In the recorded matter 210*a* shown in FIG. 2A, color mixing caused in the boundary between the white image Pw and the color image Pc, which is so-called horizontal bleeding, was evaluated. A state where color mixing was not caused in a duty of 100% was evaluated to be "A", and a state where color mixing was caused even in a duty of 50% was evaluated to be "C", whereby the color mixing was evaluated by being classified into three degrees.

4) Sinking of White Ink into Color Image Pc

In the recorded matter 210*b* shown in FIG. 2B, sinking of the white ink into the color image Pc that was caused when the white ink for forming the white image Pw is discharged onto the color image Pc, which is so-called vertical bleeding, was evaluated. A state where sinking was not caused was evaluated to be "A", and a state where sinking, which can be visually observed from the opposite surface of the surface of the recording medium 200 where recording was performed, was caused was evaluated to be "C", whereby the sinking was evaluated by being classified into three degrees.

TABLE 2

| | | |
|---|---|---|
| Irregular aggregation on recording medium | A | No aggregation in a duty of 100% |
| | B | No aggregation up to a duty of 70% |
| | C | Aggregation was caused even in a duty of 50% |
| Irregular aggregation at the time of superposition of ink | A | No aggregation in a duty of 100% |
| | B | No aggregation up to a duty of 70% |
| | C | Aggregation was caused even in a duty of 50% |
| Color mixing between white image and color image (horizontal bleeding) | A | No color mixing in a duty of 100% |
| | B | No color mixing up to a duty of 70% |
| | C | Color mixing was caused even in a duty of 50% |
| Sinking of white ink into color image (vertical bleeding) | A | No sinking |
| | B | Sinking could be confirmed from the recorded surface, but not confirmed from the opposite surface (back surface) of the recorded surface. |
| | C | Sinking could be confirmed from the opposite surface (back surface) of the recorded surface. |

In addition, it was considered that in all of the above evaluation criteria including "irregular aggregation of the ink on the recording medium 200", "irregular aggregation at the time of superposition of ink", "color mixing between the white image Pw and the color image Pc", and "sinking of the white ink into the color image Pc", the result evaluated to be "C" would not be yielded.

As shown in FIG. 3, Examples 1 to 4 in which a difference between the surface tension (S1) of the white ink and the surface tension (S2) of the color ink is from −4 to 2 yielded excellent results. However, in Comparative example 1 in which a difference between the surface tension (S1) of the white ink and the surface tension (S2) was −5 or less and Comparative example 2 in which a difference between the surface tension (S1) of the white ink and the surface tension (S2) was 3 or greater, there were items evaluated to be "C".

What is claimed is:

1. An ink jet recording apparatus comprising:
   an ink set including:
   an ink composition for background containing a pigment for background and a fluorosurfactant, the pigment for background being either a white pigment or a glitter pigment and
   a coloring ink composition containing a coloring pigment, the coloring pigment being a pigment other than the white pigment or the glitter pigment;
   an ink cartridge containing the ink composition;
   a recording medium on which the ink composition is recorded;
   an ink jet recording head for discharging the ink composition to the recording medium; and
   an operation controller for selecting a recording mode on the recording medium,
   wherein:
   the operation controller selects A mode in which the ink composition for background is recorded on an image which has been recorded on the recording medium using the coloring ink composition,
   the recording medium which does not absorbs ink or absorbs ink to low degree,
   the surface tension of the ink composition for background is S1 (mN/m), and the surface tension of the coloring ink composition is S2 (mN/m), S1 and S2 satisfy $-5<(S1-S2)<4$, and
   a sedimentation speed v of the pigment for background that is represented by a formula $v =\{(\rho-\rho_w)gR^2\}/(18\eta)$ is $2.0\times10^{-6}$(cm/s) or higher, where v represents a sedimentation speed, $\rho$ represents a pigment density, $\rho w$ represents a solvent density, g represents acceleration of gravity, R represents a pigment diameter, and $\eta$ represents a solvent viscosity.

2. The ink jet recording apparatus according to claim 1, wherein the S1 is 28 (mN/m) or less.

3. The ink jet recording apparatus according to claim 1, wherein the ink composition for background and the coloring ink composition contain one or more kinds selected from a group consisting of glycol ethers having an HLB value in a range of 4.2 to 7.8 that is measured by Davies' method and a polyether siloxane-based surfactant.

4. The ink jet recording apparatus according to claim 1, further comprising a drying unit to controlling a degree of drying of an image which has been recorded using the coloring ink composition in the A mode is from 40% to 90%, wherein when the image is formed by imparting the ink composition for background to the recording medium, a mass of the recording medium corresponds to 0% of a degree of drying, and at a point in time when the mass of the recording medium substantially stops changing after the image is dried under predetermined drying conditions, the degree of drying corresponds to 100%.

5. The ink jet recording apparatus according to claim 1, further comprising:
   the operation controller further has an option to select a B mode in which the coloring ink composition is recorded on the image which has been recorded using the ink composition for background.

6. The inkjet recording apparatus according to claim 5, further comprising:
   the drying unit for controlling a degree of drying of the image, which has been recorded using the coloring ink composition, at the time when the ink composition for background is recorded in the A mode is higher than a degree of drying of the image, which has been recorded using the ink composition for background, at the time when the coloring ink composition is recorded in the B mode,
   wherein when the image is formed by imparting either the coloring ink composition or the ink composition for background to the recording medium, a mass of the recording medium corresponds to 0% of a degree of drying, and at a point in time when the mass of the recording medium substantially stops changing after the image is dried under predetermined drying conditions, the degree of drying corresponds to 100%.

7. The ink jet recording apparatus according to claim 5, wherein:
   the drying unit is used for drying the ink composition for background or the coloring ink composition recorded on a recording medium, and
   the drying unit consumes a longer time to dry the coloring ink composition recorded before the ink composition for background is recorded in the A mode than to dry the ink composition for background recorded before the coloring ink composition is recorded in the B mode.

8. An ink jet recording method comprising:
   an ink set preparing step for preparing an ink set including:
   an ink composition for background containing a pigment for background and a fluorosurfactant, the pigment for background being either a white pigment or a glitter pigment and
   a coloring ink composition containing a coloring pigment, the coloring pigment being a pigment other than the white pigment or the glitter pigment;
   an operating step for selecting A mode as a recording mode, the A mode in which the ink composition for background is recorded on an image which has been recorded on a recording medium using the coloring ink composition;
   an image recording step recording the image on the recording medium using the coloring ink composition; and
   a background forming step for recording the background using the ink composition fore background on the image,
   wherein,
   the recording medium which does not absorbs ink or absorbs ink to low degree,
   the surface tension of the ink composition for background is S1 (mN/m), and the surface tension of the coloring ink composition is S2 (mN/m), S1 and S2 satisfy $-5<(S1-S2)<4$, and
   a sedimentation speed v of the pigment for background that is represented by a formula $v =\{(\rho-\rho_w)gR^2\}/(18\eta)$ is $2.0\times10^{-6}$ (cm/s) or higher, where v represents a sedimentation speed, $\rho$ represents a pigment density, $\rho w$ represents a solvent density, g represents acceleration of gravity, R represents a pigment diameter, and $\eta$ represents a solvent viscosity.

9. The ink jet recording method according to claim 8, wherein the S1 is 28 (mN/m) or less.

10. The ink jet recording method according to claim 8, wherein the ink composition for background and the coloring ink composition contain one or more kinds selected from a group consisting of glycol ethers having an HLB value in a range of 4.2 to 7.8 that is measured by Davies' method and a polyether siloxane-based surfactant.

11. The ink jet recording method according to claim 8, further comprising a drying step after the image forming step, the drying step for controlling a degree of drying of an image which has been recorded using the coloring ink composition in the A mode is from 40% to 90%,
wherein when the image is formed by imparting the ink composition for background to the recording medium, a mass of the recording medium corresponds to 0% of a degree of drying, and at a point in time when the mass of the recording medium substantially stops changing after the image is dried under predetermined drying conditions, the degree of drying corresponds to 100%.

12. The ink jet recording method according to claim 8, the operating step further selecting a B mode in which the coloring ink composition is recorded on the image which has been recorded using the ink composition for background.

13. The inkjet recording method according to claim 12, wherein:
the drying step for controlling a degree of drying of the image, which has been recorded using the coloring ink composition, at the time when the ink composition for background is recorded in the A mode is higher than a degree of drying of the image, which has been recorded using the ink composition for background, at the time when the coloring ink composition is recorded in the B mode, and
wherein when the image is formed by imparting either the coloring ink composition or the ink composition for background to the recording medium, a mass of the recording medium corresponds to 0% of a degree of drying, and at a point in time when the mass of the recording medium substantially stops changing after the image is dried under predetermined drying conditions, the degree of drying corresponds to 100%.

14. The ink jet recording method according to claim 12, wherein:
the drying step for drying the ink composition for background or the coloring ink composition recorded on a recording medium, and
the drying step consumes a longer time to dry the coloring ink composition recorded before the ink composition for background is recorded in the A mode than to dry the ink composition for background recorded before the coloring ink composition is recorded in the B mode.

* * * * *